United States Patent
Diamant et al.

(10) Patent No.: US 9,959,227 B1
(45) Date of Patent: May 1, 2018

(54) REDUCING INPUT/OUTPUT LATENCY USING A DIRECT MEMORY ACCESS (DMA) ENGINE

(71) Applicant: Amazon Technologies, Inc., Seattle, WA (US)

(72) Inventors: Ron Diamant, Albany, CA (US); Georgy Machulsky, San Jose, CA (US); Adi Habusha, Moshav Alonei Abba (IL)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 14/971,759

(22) Filed: Dec. 16, 2015

(51) Int. Cl.
*G06F 13/00* (2006.01)
*G06F 13/28* (2006.01)
*G06F 12/0862* (2016.01)

(52) U.S. Cl.
CPC .......... *G06F 13/28* (2013.01); *G06F 12/0862* (2013.01); *G06F 2212/6028* (2013.01)

(58) Field of Classification Search
CPC .............................. G06F 13/28; G06F 12/0862
See application file for complete search history.

(56) References Cited

U.S. PATENT DOCUMENTS

| 2007/0073922 A1* | 3/2007 | Go | G06F 13/28 710/22 |
| 2009/0287857 A1* | 11/2009 | Vu | G06F 13/28 710/22 |

* cited by examiner

*Primary Examiner* — Zachary K Huson
(74) *Attorney, Agent, or Firm* — Klarquist Sparkman LLP (57) ABSTRACT

Apparatus and methods are disclosed herein for reducing I/O latency when accessing data using a direct memory access (DMA) engine with a parser. A DMA descriptor indicating memory buffer location can be stored in cache. A DMA descriptor read command is generated and can include a prefetch command. A descriptor with the indicator can be communicated to the DMA engine in response to the read. A second parser can detect the descriptor communication, parse the descriptor, and can prefetch data from memory to cache while the descriptor is being communicated to the DMA engine and/or parsed by the DMA engine parser. When the DMA engine parses the descriptor, data can be accessed from cache rather than memory, to decrease latency.

20 Claims, 10 Drawing Sheets

REDUCING INPUT/OUTPUT LATENCY USING A DIRECT MEMORY ACCESS (DMA) ENGINE

BACKGROUND

Direct Memory Access (DMA) allows for memory access within a host computer as well as from one host computer to another host computer. In this regard, DMA technologies can be used to create large, massively parallel computing environments, and can be applied in a cloud computing environment among other computing environments. Cloud computing is the use of computing resources (hardware and software) which are available in a remote location and accessible over a network, such as the Internet. Users are able to buy these computing resources (including storage and computing power) as a utility on demand. While DMA technologies can provide access to data stored in a host computer's memory, latency considerations when accessing the stored data are also important, especially when performing a single DMA operation.

DETAILED DESCRIPTION

Apparatus, methods, and computer-readable storage media are disclosed herein for reducing input/output (I/O) latency using a direct memory access (DMA) engine. The disclosed direct memory access techniques improve the DMA latency associated with memory access when using a DMA controller with a DMA engine. More specifically, when data is stored in memory (e.g., in a memory buffer), descriptor data providing information on the memory buffer (e.g., memory address, buffer size, and so forth) can be stored in memory or in cache (e.g., separate from the memory). Upon receiving a memory access request, the DMA engine can initially issue a descriptor read command to obtain data indicating the memory buffer location and one or more operations to be performed on the data. The descriptor read command can include one or more "prefetch enable" indicators, which can be returned back to the DMA engine with the descriptor data. Each of the one or more prefetch enable indicators can be associated with a different communication protocol, and each of the one or more prefetch enable indicators can be turned ON or OFF using a configuration write (e.g., a configuration write command to a prefetch enable register in the DMA engine).

The DMA engine includes a parsing engine, which can be configured to parse the descriptor information, obtain the memory buffer location and access the memory buffer. However, when the descriptor and the "prefetch enable" notification are being sent to the DMA engine from memory or from cache (based on where the descriptor is stored), a second parsing engine can intercept/detect the communication (e.g., by detecting the "prefetch enable" indicator) and can copy the descriptor data. The second parsing engine can be located outside of the DMA engine and can use a shorter data path to memory and cache (e.g., the second parsing engine can be physically closer to memory and cache than the DMA engine is). While the DMA descriptor is being communicated to the DMA engine, the second parsing engine can parse the descriptor, locate the memory buffer, and pre-fetch (e.g., copy or move) the data from memory to cache. When the DMA engine parses the descriptor, a data read can be issued and the data can be read from cache rather than memory. In this regard, by using a second parsing engine that is separate from the DMA engine and is physically closer to cache, reading the descriptor data and accessing the data can be partially pipelined. More specifically, the descriptor data is parsed by the second parsing engine and prefetching of the data can proceed, while the descriptor is still being communicated and/or parsed by the DMA engine. Additional latency improvements are realized as access to cache is faster than access to memory.

Figure 1:
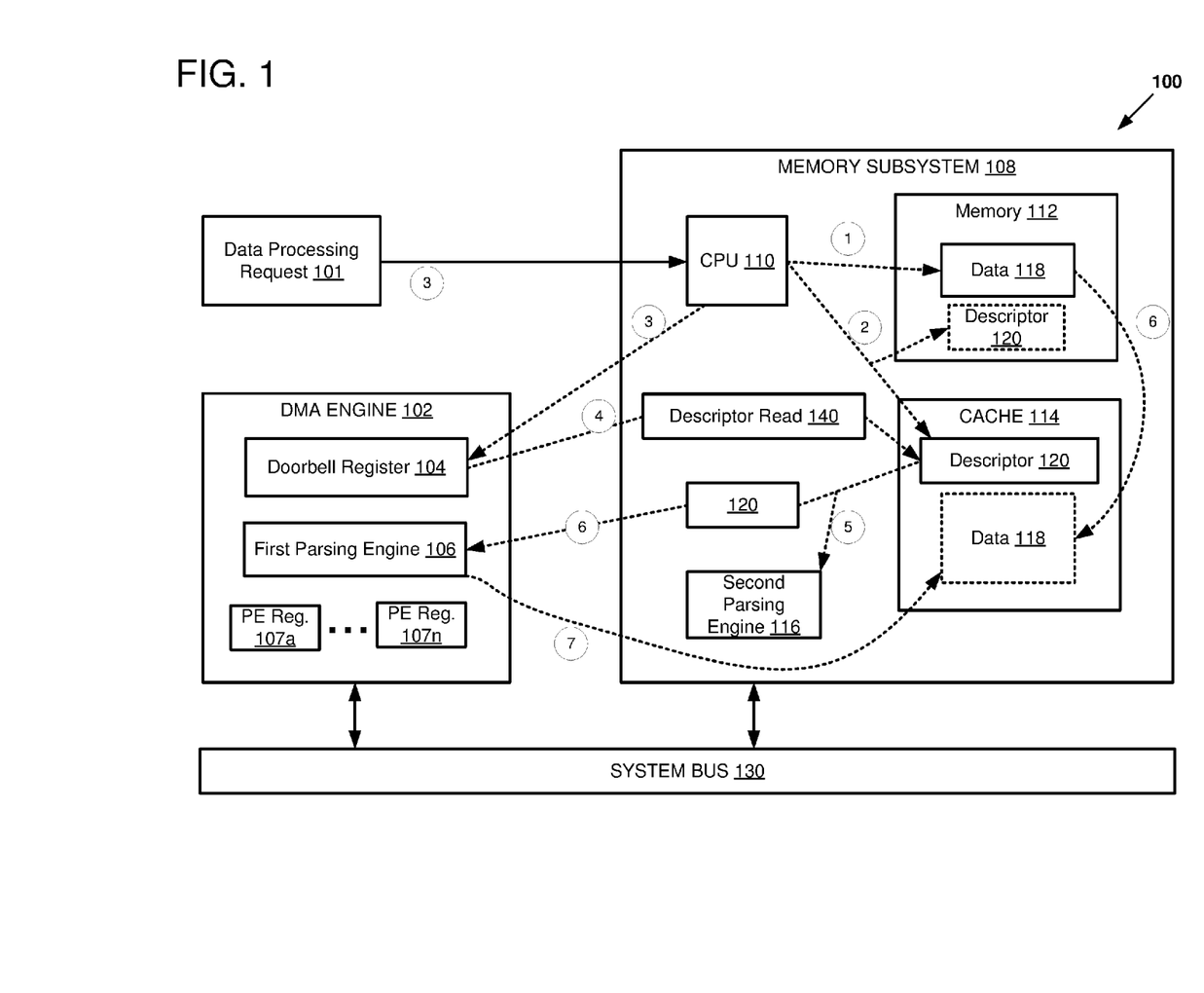
FIG. 1 is block diagram of a suitable system environment in which certain examples of the disclosed technology, including a direct memory access (DMA) controller, can be implemented.

FIG. 1 is block diagram of a suitable system environment in which certain examples of the disclosed technology, including a direct memory access (DMA) controller, can be implemented. Referring to FIG. 1, the DMA controller 100 may comprise a DMA engine 102 and a memory subsystem 108. The DMA engine 102 may comprise suitable circuitry, interfaces, logic and/or code and is configured to perform process/parse descriptors (e.g., using the first parsing engine 106), access data stored in the memory subsystem 108 and perform one or more processing functions on the data. The DMA engine 102 also comprises a "doorbell" register 104, which can be used to trigger direct memory access and data processing.

The memory subsystem 108 comprises a processor (CPU) 110, memory 112, and cache 114. The cache 114 can be implemented separately from the memory 112, as illustrated in FIG. 1. In an example embodiment, the memory subsystem 108 also includes a second parsing engine 116, which can be configured to parse descriptor data and/or perform one or more data processing functions on data, similar to the first parsing engine 106 within the DMA engine 102. The second parsing engine 116 can be implemented separately from the DMA engine 102 so that it is within the memory subsystem 108 and has a shorter data path to the cache 114 and memory 112 in comparison to the first parsing engine 106. In some examples, a shorter data path to cache or memory can be achieved by placing components physically closer to the cache or memory, or by modifying the component's clock frequency. Additionally, the second parsing engine 116 can be configured to prefetch data (e.g., move or copy) from one location to another, as explained herein below.

In an example embodiment, the second parsing engine 116 can be programmable and can be configured to process any DMA descriptor protocol. For example, the DMA controller 100 can include multiple DMA engines, each associated with a different descriptor protocol (e.g., one DMA engine can be used for storage associated transactions and another DMA engine can be used for networking). The second parsing engine (116) (as well as the first parsing engine 106) can be programmed to process descriptors of different type (e.g., associated with a different DMA engine) concurrently or only one of them at a time.

In yet another example embodiment, prefetch enabling can be a separate setting and can be performed by the DMA engine 102 using separate prefetch enable registers (PERs) 107a, . . . , 107n. More specifically, each of the PERs 107a, . . . , 107n can be associated with a different communication protocol. The CPU 110 can then turn prefetching ON or OFF for one or more of the communication protocols by writing to a corresponding one or more of the prefetch enable registers 107a, . . . , 107n. The DMA engine 102 can also include multiple processing queues associated with different communication protocols (or the same communication protocol), where each processing queue can be associated with one of the PERs 107a, . . . , 107n based on the communication protocol used by the queue. In this regard, prefetching can be enabled for some queues but not others, and the queues can be processed in parallel. Prefetch enabling can be indicated using one or more bits in a communication channel, based on the communication protocol. The second parsing engine 116 can be configured to detect the prefetch enable indication for a given descriptor communicated using one of a plurality of available communication or networking protocols. In this regard, the prefetching done by the second parsing engine 116 can be enabled for some processing queues but not others, in order to optimize parallel processing of data and reduce data processing latency by the controller 100.

Figure 4:
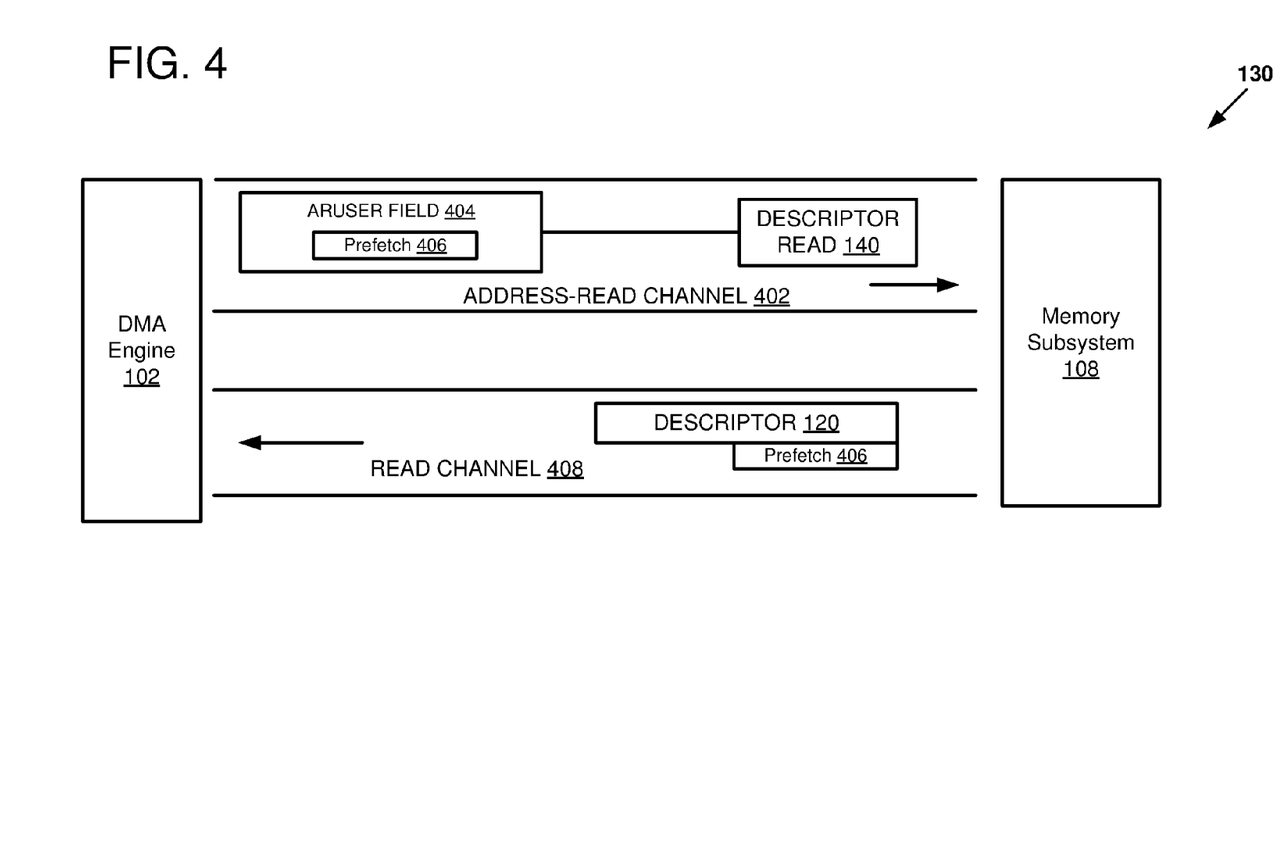
FIG. 4 is a diagram depicting example communications of a system bus using prefetch notifications, in accordance with an example embodiment of the disclosure.

The components of the DMA controller 100 can be communicatively coupled via a system bus 130, which can be, for example, an Advanced eXtensible Interface (AXI) bus or an Advanced High-Performance Bus (AHB). In an example embodiment, the system bus 130 can use one type of communication channel for communications from the DMA engine 102 to the memory subsystem 108, and another type of communication channel can be used for communications from the memory subsystem 108 to the DMA engine 102. Example types of communication channels are illustrated in FIG. 4. In an example embodiment, different communication or networking protocols can be used as well. As mentioned, multiple prefetch enable registers 107a, . . . , 107n can be used, each associated with a different communication/networking protocol. The communication channel 402 can then include multiple bits that can be set to indicate prefetching is enabled when the descriptor is associated with a given communication/networking protocol (each bit that is set in the communication channel 402 can correspond to one of protocols associated with the PERs 117a, . . . , 117n). The prefetch enable bit (or bits) can be replicated in the return channel 408, used for sending the descriptor 120. The second parsing engine 116 can detect the descriptor type (e.g., protocol of the descriptor) and then based on the type, determine whether a prefetch enable bit for the determined protocol is enabled or not. If prefetching is enabled for the determined protocol for the descriptor, then prefetching can proceed and data can be moved from memory to cache.

Figure 2:
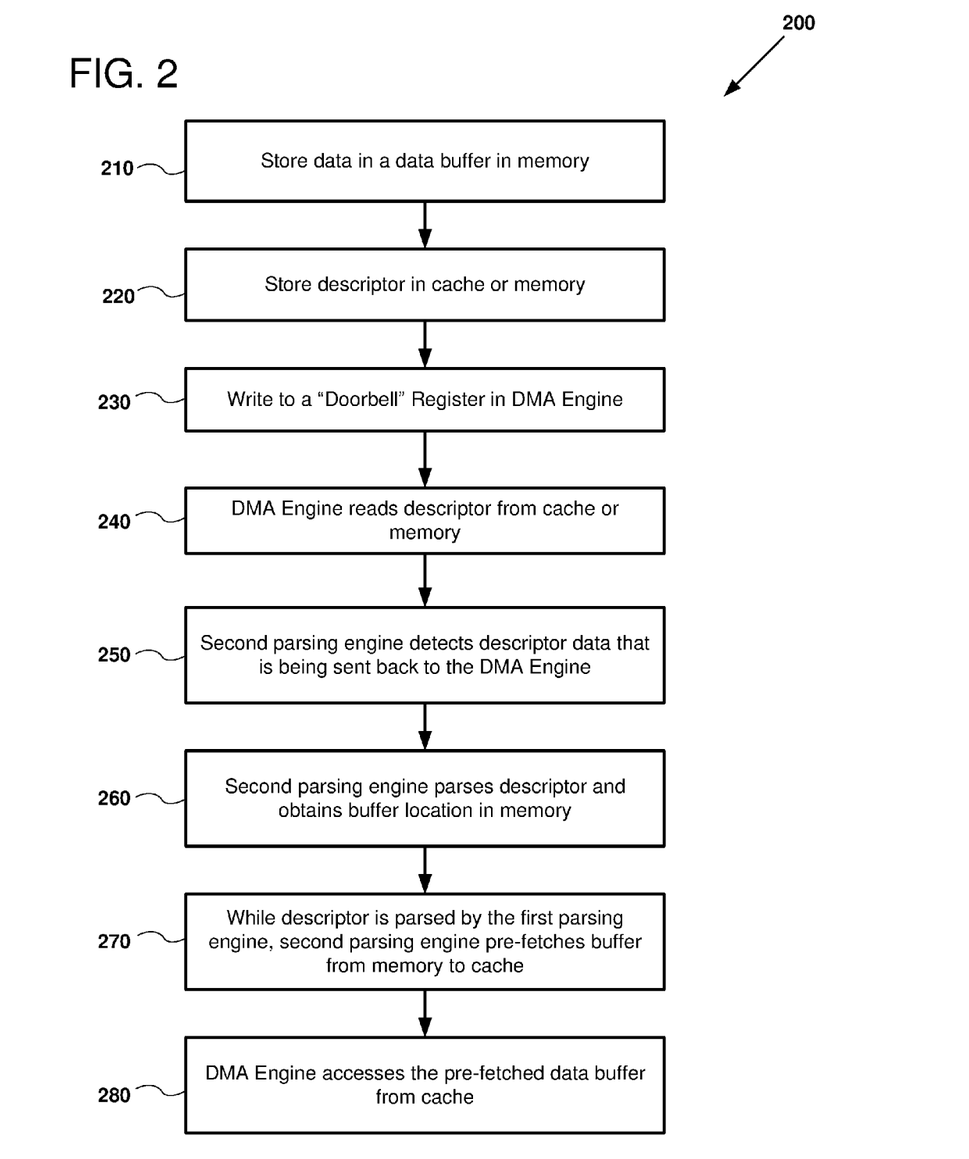
FIG. 2 is a flowchart outlining an example method of reducing input/output (I/O) latency using a DMA engine, in accordance with an example embodiment of the disclosure.

FIG. 2 is a flowchart outlining an example method of reducing input/output (I/O) latency using a DMA engine, in accordance with an example embodiment of the disclosure. Referring to FIGS. 1-2, the example method 200 may start at 210, when data is stored (reference 1 in FIG. 1) in a data buffer in memory. For example, the CPU 110 (or another device coupled to the DMA controller 100) can store data 118 in memory 112 (e.g., in a memory buffer).

Figure 3:
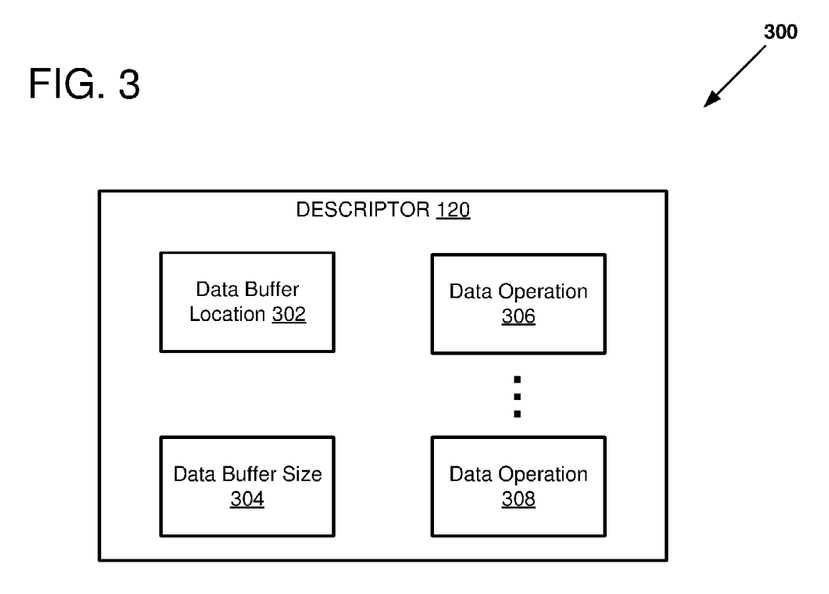
FIG. 3 is a block diagram of an example descriptor for DMA memory access, in accordance with an example embodiment of the disclosure.

At 220 (and reference 2 in FIG. 1), a descriptor is stored in cache 114 or memory 112. For example, the CPU 110 stores descriptor 120 in cache 114 or memory 112. FIG. 3 is a block diagram of an example descriptor for DMA memory access, in accordance with an example embodiment of the disclosure. Referring to FIG. 3, the descriptor 120 is associated with the data 118 (e.g., one descriptor may be generated and stored in cache 114 for specific data stored in memory), and includes data buffer location 302, data buffer size 304 and one or more data operations 306, . . . , 308 which can be performed on the data 118.

At 230 (and reference 3 in FIG. 1), the CPU 110 can write to the "doorbell" register 104 in the DMA engine 102. For example, the DMA controller 100 receives a data processing request 101, and in response to the request, the CPU 110 writes to the register 104 to trigger memory access and processing of data. In an example embodiment, the CPU can provide information to the DMA engine to identify the data 118 and the corresponding descriptor 120.

At 240, the DMA engine 102 reads the descriptor from cache or memory. More specifically, the DMA engine 102 generates a descriptor read command 140, which is communicated to the memory subsystem 108. FIG. 4 is a diagram depicting example communications of a system bus using prefetch notifications, in accordance with an example embodiment of the disclosure. Referring to FIG. 4, the system bus 130 can be an AXI bus, using an address-read channel 402 and a read channel 408. More specifically, the address-read channel 402 can be used for communication of descriptor read commands (e.g., descriptor read command 140), and the read channel 408 can be used to communicate the descriptor information 120 from the memory subsystem 108 to the DMA engine 102. In an example embodiment, the DMA controller 100 (i.e., the CPU 110 or the DMA engine 102) can provide a prefetch indicator 406 with the descriptor read command 140. The prefetch indicator 406 can be provided/stored in an Address-Read User (ARUSER) field 404 associated with the address read channel 402. The prefetch indicator 406 traverses the communication channel 402 from the DMA engine 402 to the memory subsystem 108, and then the indicator 406 is returned back with the read response (e.g., the descriptor 120) sent along the read channel 408. In this regard, the prefetch enable information 406 sent with the descriptor 120, can be intercepted by, e.g., the second parsing engine 116. For example, the second parsing engine 116 can detect the prefetch indicator 406, and upon detecting the indicator, will consider the associated data (e.g., 120) as a descriptor. The descriptor can then be copied by the second parsing engine 116 for parsing, while the original communication of the descriptor 120 to the first parsing engine 106 is not interrupted.

Even though FIG. 4 illustrates a single prefetch indicator 406 (e.g., a single bit set in the ARUSER field 404), multiple prefetch indicators can be used (e.g., multiple bits can be set in the communication channel 402), where each bit can be used for a specific type of communication protocol and descriptor. Additionally, even though FIG. 4 illustrates the use of a prefetch enable indicator bit (e.g., 406) in connection with an AXI bus, the present disclosure is not limited in this regard and other types of communication protocols can be used as well. For example, when components associated with the DMA controller 100 are not on the same silicon die or in the same semiconductor package, Peripheral Component Interconnect Express (PCIe) communication bus can also be used, in addition to other communication protocols. For example, a prefetch enable bit can be set and used for an AXI bus, and the prefetch enable bit can be translated (e.g., by a PCI port) to a PCIe "hint" when communication across a PCIe device is necessary for DMA access and to enable prefetching.

At 250 (and reference 5 in FIG. 1), the second parsing engine 116 detects the prefetch indicator 406 and then the descriptor data 120 that is being communicated to the DMA engine 102. At 260, the second parsing engine 116 parses the descriptor 120 (e.g., a copy of the descriptor 120 can be stored at the engine 116) to obtain the location of the memory buffer storing the data 118 in memory 112. Optionally, the second parsing engine 116 can also obtain one or more data processing operations from the descriptor 120, for applying to the data 118. The parsing of the descriptor 120 by the second parsing engine 116 can take place while the descriptor 120 is being communicated to the first parsing engine 106.

At 270 (and reference 6 in FIG. 1), the second parsing engine 116 can prefetch the data 118 (e.g., move or copy) from the memory 112 to the cache 114. The prefetching can take place while the descriptor is being communicated to the first parsing engine or while the descriptor is being parsed by the first parsing engine 106. In this regard, pipelining of the descriptor read command (e.g., by the first engine 106) and data buffer read (e.g., by the second engine 116) can take place. After the data is prefetched into cache 114 and the first parsing engine 106 parses the descriptor 120, the first parsing engine 106 can issue a data buffer read (e.g., at reference 7 in FIG. 1), and can access the data 118 from cache (which can be a data access with lower latency compared to data access from memory 112). Additionally, one or more data processing operations can be applied by the DMA engine 102 and/or the second parsing engine 116.

The second parsing engine 116 can be inserted in the communication pathway for descriptor read responses (e.g., along the read channel 408), physically closer to the memory 112 and cache 114 than the DMA engine 102 is. The second parsing engine 116 can then inspect communications (e.g., responses to read requests received from the DMA engine 102) for a prefetch enable indicator. When such indicator is detected for a given read response, then the response is determined to be a descriptor, it is copied to the second parsing engine 116, it is parsed, and corresponding data is prefetched from memory 112 to cache 114, which reduces latency for data access as access to cache is faster than access to memory. The parsing of the descriptor and the prefetching by the second parsing engine 116 can be pipelined (e.g., at least partially performed at the same time as receiving and parsing the descriptor by the first parsing engine 106), thereby further decreasing the latency used for accessing the data 118.

Figure 5:
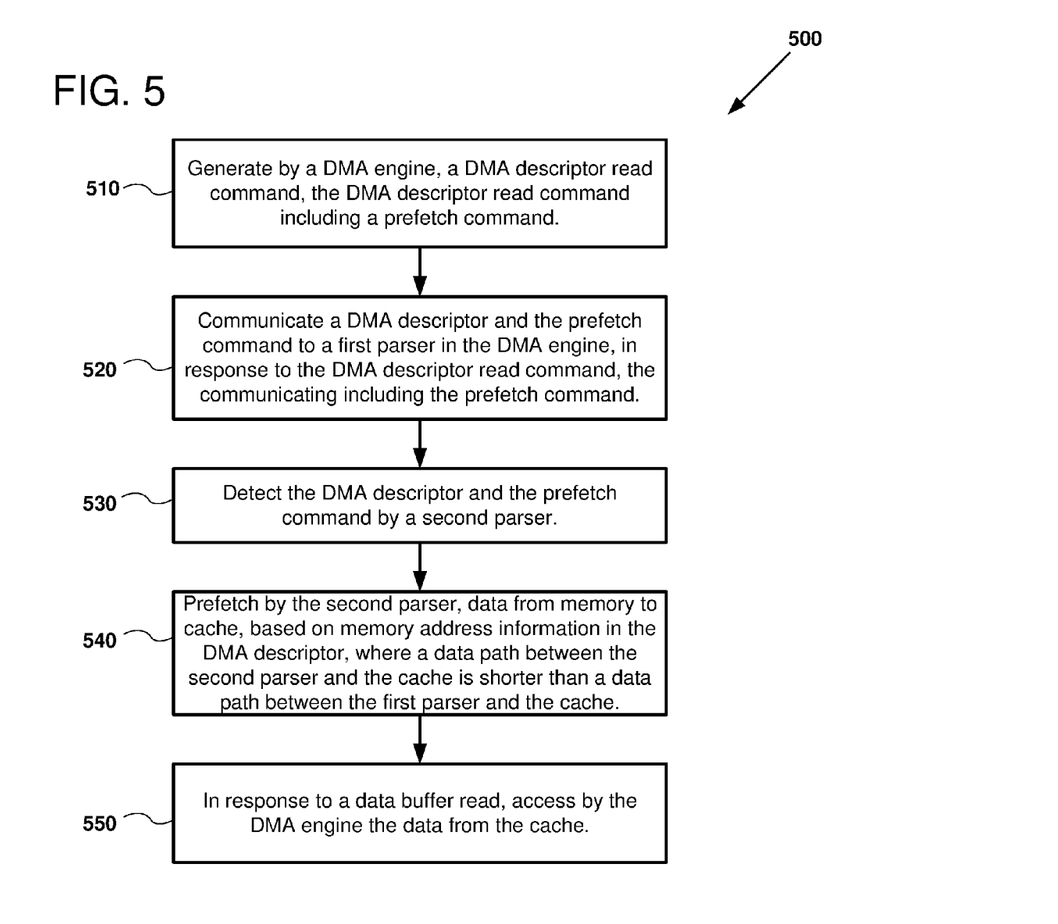
FIGS. 5-7 are flowcharts outlining example methods of generating addresses, as can be performed in certain examples of the disclosed technology.
Figure 6:
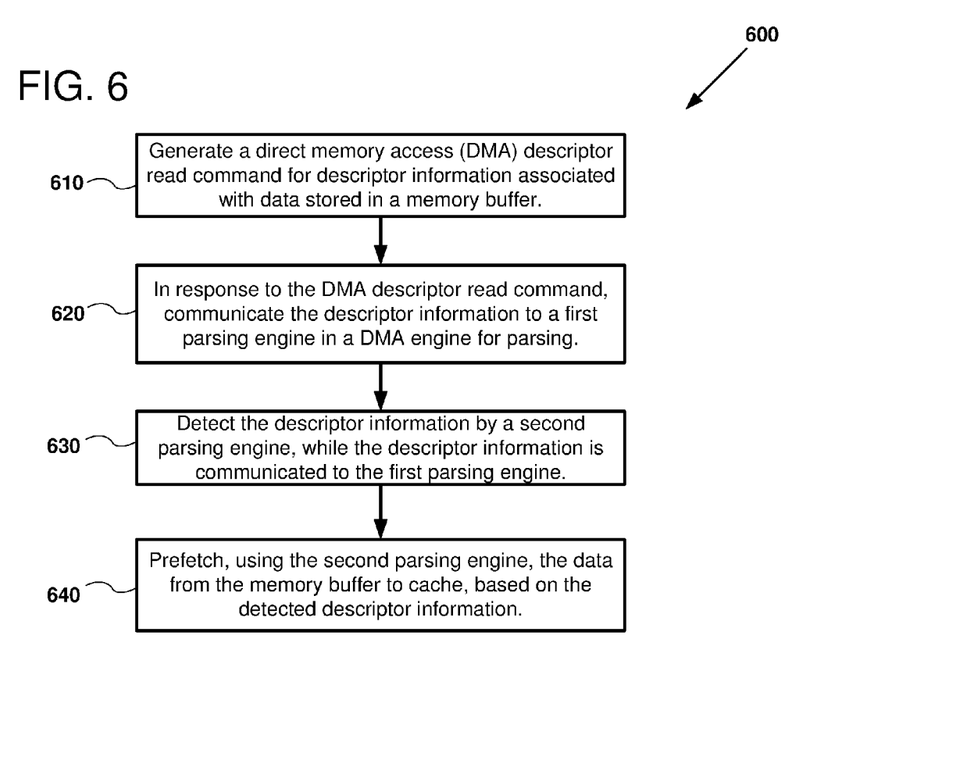
Figure 7:
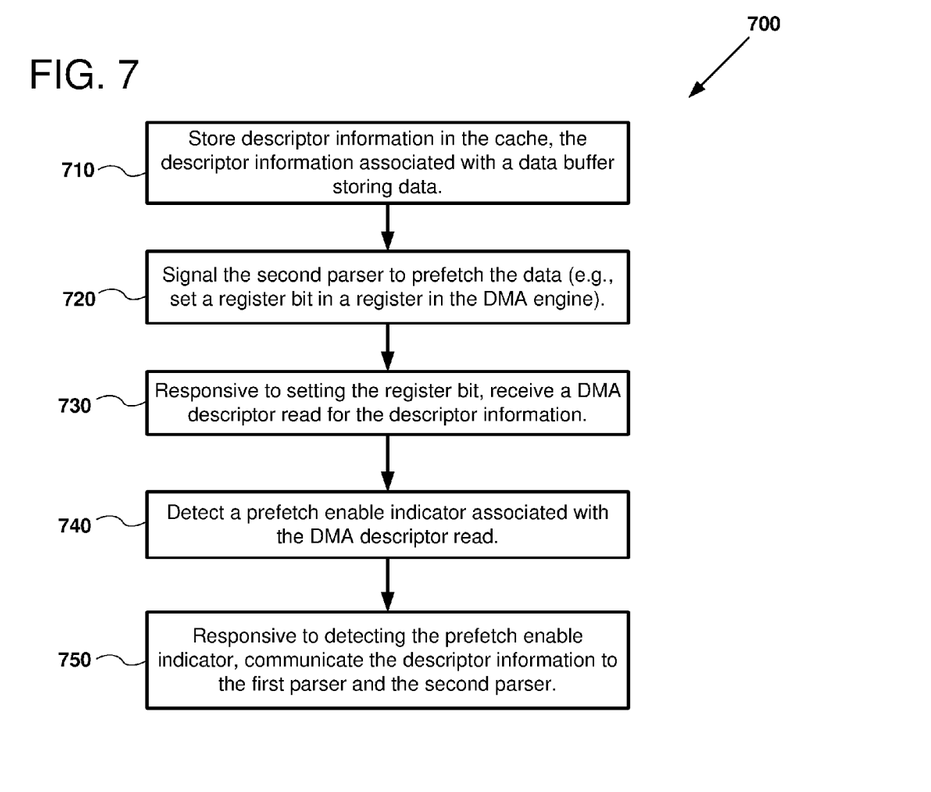

FIGS. 5-7 are flowcharts outlining example methods of generating addresses, as can be performed in certain examples of the disclosed technology. Referring to FIGS. 1 and 3-5, the example method 500 may start at 510, when a DMA descriptor read command is generated by a DMA engine. For example, the DMA engine 102 generates/issues the descriptor read command 140 in response to the CPU 110 writing to the doorbell register 104. The descriptor read command 140 can be a request for obtaining a descriptor.

For example, the request can identify the data 118 and one of a plurality of descriptors available for data 118. The DMA descriptor read command 140 can also include a prefetch command (e.g., a prefetch enable indication such as a prefetch enable bit that is set, such as the indicator 406 used in connection with the ARUSER field 404). At 520, a DMA descriptor and the prefetch command are communicated to a first parser in the DMA engine, in response to the DMA descriptor read command, the communicating including the prefetch command. For example, the memory subsystem 108 can send the descriptor 120 back to the DMA engine 102 and the first parsing engine 106, in response to the descriptor read command 140. The descriptor 120 can include the prefetch command (e.g., the prefetch enabled indicator 406). At 530, the DMA descriptor and the prefetch command are detected by a second parser. For example, the descriptor 120 and the prefetch enabled indicator 406 are detected by the second parsing engine 116. At 540, data is prefetched by the second parser from memory to cache, based on memory address information in the DMA descriptor. A data path between the second parser and the cache can be shorter than a data path between the first parser and the cache (e.g., the second parser can be physically closer to the cache than the first parser is). For example, the second parser 116 retains a copy of the descriptor 120 and parses it to obtain memory buffer address for the buffer storing data 118 in memory 112. The second parsing engine 116 then prefetches (e.g., copies or moves) the data 118 from memory 112 to cache 114. At 550, in response to a data buffer read, the data is accessed by the DMA engine from the cache. For example, after the descriptor 120 is received by the DMA engine 102, the first parsing engine 106 also parses the descriptor and issues a data buffer read. However, since the data 118 has been prefetched to cache 114, data is accessed from the cache 114 rather than from memory 108.

Referring to FIGS. 1, 3-4 and 6, the example method 600 starts at 610, when a direct memory access (DMA) descriptor read command is generated, for descriptor information associated with data stored in a memory buffer. For example, the DMA engine 102 generates the descriptor read command 140 for descriptor information associated with data 118 stored in memory. At 620, in response to the DMA descriptor read command, the descriptor information is communicated to a first parsing engine in a DMA engine for parsing. For example, the memory subsystem 108 receives the descriptor read command 140 and in response, communicates the descriptor 120 back to the DMA engine for parsing by the first parsing engine 106. At 630, the descriptor information is detected by a second parsing engine, while the descriptor information is communicated to the first parsing engine. For example, the descriptor 120 communicated back to the first parsing engine 106 can include a prefetch enable indicator 406 (e.g., the same prefetch enable indicator 406 can be detected with the descriptor read command 140 and replicated on the reply back when the descriptor 120 is sent to the DMA engine 102). The second parsing engine 116 detects the prefetch enable indicator 406, and retains a copy of the descriptor 120 for parsing, while the descriptor 120 is communicated back to the DMA engine 102. At 640, the data is prefetched, using the second parsing engine, from the memory buffer to cache. For example, the second parsing engine 116 can parse the descriptor 120 and obtain the memory address for the buffer storing the data 118 in memory 112. The second parsing engine 116 can then prefetch the data 118 from the memory 112 into the cache 114.

Referring to FIGS. 1, 3-4 and 7, the example method 700 starts at 710, when descriptor information is stored in cache, the descriptor information associated with data. For example, the CPU 110 stores the data 118 in memory 112, and descriptor information 120 in cache 114. The descriptor 120 can include data buffer location 302, data buffer size 304 and one or more data operations 306, . . . , 308 which can be performed on the data 118. At 720, the second parser can be signaled to perform prefetching (e.g., a register bit can be set in a register in the DMA engine to signal the second parser that prefetching is enabled). For example, the CPU 110 can write to (e.g., set a bit) in the doorbell register 104. At 730, responsive to setting the register bit, a DMA descriptor read command is received for descriptor information. For example, in response to the writing into the register 104, the DMA engine 102 generates/issues a DMA descriptor read command (e.g., a descriptor read command request) 140, which is received by the memory subsystem 108. At 740, a prefetch enable indicator associated with the DMA descriptor read command is detected. For example, the memory subsystem 108 detects a prefetch enable indicator 406 with the descriptor read command 140, and replicates the indicator 406 so that it is communicated back with the response (the descriptor 120) to the DMA engine 102. At 750, responsive to detecting the prefetch enable indicator, the memory subsystem 108 communicates the descriptor information along the communication channel 408, so that it is received by the first parser (e.g., 106) and the second parser (e.g., 116).

Figure 8:
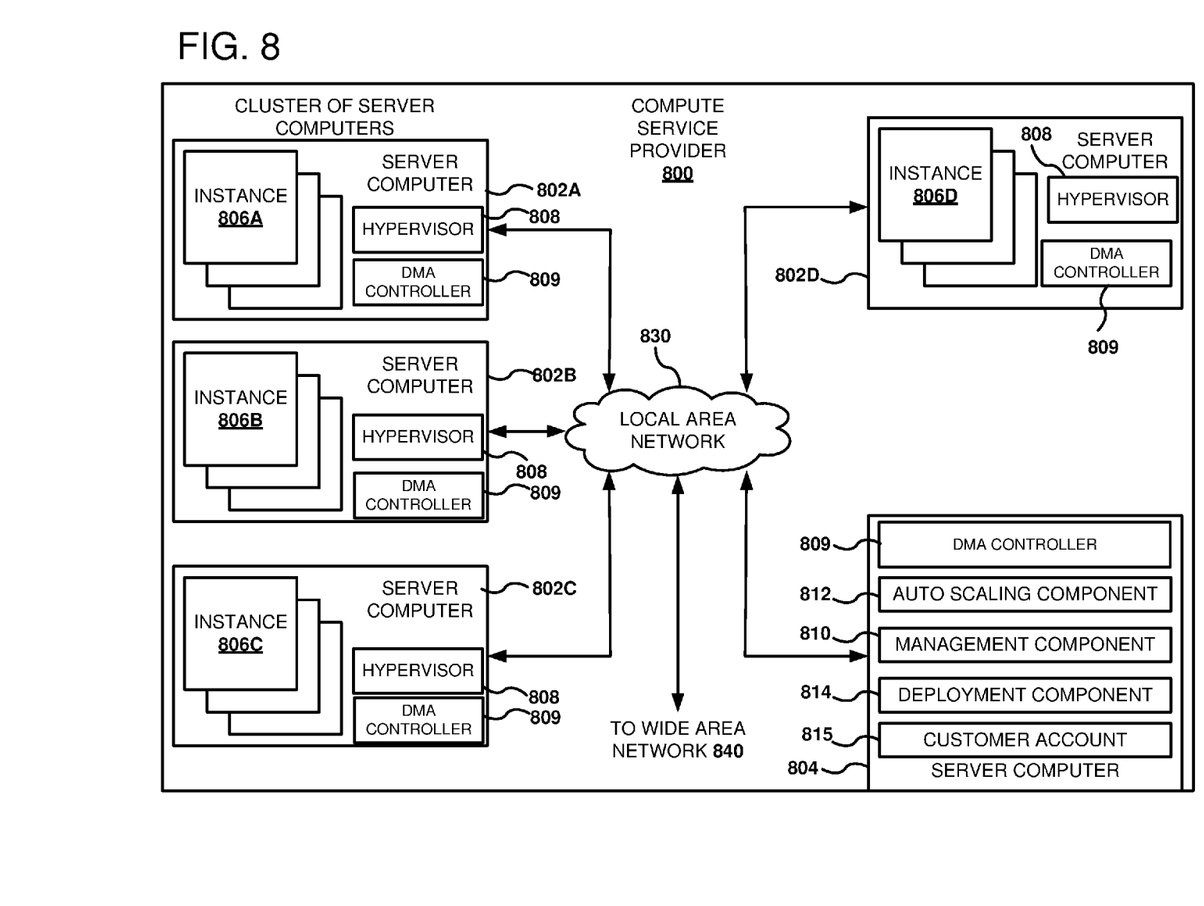
FIG. 8 is an example system diagram showing a plurality of virtual machine instances running in a multi-tenant environment.

FIG. 8 is a computing system diagram of a network-based compute service provider 800 that illustrates one environment in which embodiments described herein can be used. For example, the network-based compute service provider 800 can provide services based at least in part on using DMA transactions to transfer data within a host, or between two or more physical or virtual hosts. By way of background, the compute service provider 800 (e.g., a cloud provider) is capable of delivery of computing and storage capacity as a service to a community of end recipients. In an example embodiment, the compute service provider can be established for an organization by or on behalf of the organization. That is, the compute service provider 800 may offer a "private cloud environment." In another embodiment, the compute service provider 800 supports a multi-tenant environment, wherein a plurality of customers operate independently (e.g., a public cloud environment). Generally speaking, the compute service provider 800 can provide the following models: Infrastructure as a Service ("IaaS"), Platform as a Service ("PaaS"), and/or Software as a Service ("SaaS"). Other models can be provided. For the IaaS model, the compute service provider 800 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 800 using networked client devices, such as desktop computers, laptops, tablets, smartphones, etc. running web browsers or other lightweight client applications. Those skilled in the art will recognize that the compute service provider 800 can be described as a "cloud" environment.

The particular illustrated compute service provider 800 includes a plurality of server computers 802A-802D. While only four server computers are shown, any number can be used, and large centers can include thousands of server computers. The server computers 802A-802D can provide computing resources for executing software instances 806A-806D. In one embodiment, the instances 806A-806D are virtual machines. As known in the art, a virtual machine is an instance of a software implementation of a machine (e.g., a computer) that executes applications like a physical machine. In the example of virtual machine, each of the servers 802A-802D can be configured to execute a hypervisor 808 or another type of program configured to enable the execution of multiple instances 806 on a single server. Additionally, each of the instances 806 can be configured to execute one or more applications, including applications that perform DMA transactions with the use of a DMA controller 809, which can have functionalities similar to the DMA controller 100. Additionally, the DMA controller 809 can also perform remote direct memory access (RDMA) functions, so that communication between hosts can take place for purposes of memory access and data processing.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 804 can be reserved for executing software components for managing the operation of the server computers 802 and the instances 806. For example, the server computer 804 can execute a management component 810. A customer can access the management component 810 to configure various aspects of the operation of the instances 806 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 812 can scale the instances 806 based upon rules defined by the customer. In one embodiment, the auto scaling component 812 allows a customer to specify scale-up rules for use in determining when new instances should be instantiated and scale-down rules for use in determining when existing instances should be terminated. The auto scaling component 812 can consist of a number of subcomponents executing on different server computers 802 or other computing devices. The auto scaling component 812 can monitor available computing resources over an internal management network and modify resources available based on need.

A deployment component 814 can be used to assist customers in the deployment of new instances 806 of computing resources. The deployment component can have access to account information associated with the instances, such as who is the owner of the account, credit card information, country of the owner, etc. The deployment component 814 can receive a configuration from a customer that includes data describing how new instances 806 should be configured. For example, the configuration can specify one or more applications to be installed in new instances 806, provide scripts and/or other types of code to be executed for configuring new instances 806, provide cache logic specifying how an application cache should be prepared, and other types of information. The deployment component 814 can utilize the customer-provided configuration and cache logic to configure, prime, and launch new instances 806. The configuration, cache logic, and other information may be specified by a customer using the management component 810 or by providing this information directly to the deployment component 814. The instance manager can be considered part of the deployment component.

Customer account information 815 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 830 can be utilized to interconnect the server computers 802A-802D and the server computer 804. The network 830 can be a local area network (LAN) and can be connected to a Wide Area Network (WAN) 840 so that end users can access the compute service provider 800. Data for initiating and performing DMA transactions can be transferred by the network between any of the server computers 802A-802D, the server computer 804, and/or server computers accessed via the WAN 840. It should be appreciated that the network topology illustrated in FIG. 8 has been simplified and that many more networks and networking devices can be utilized to interconnect the various computing systems disclosed herein.

Figure 9:
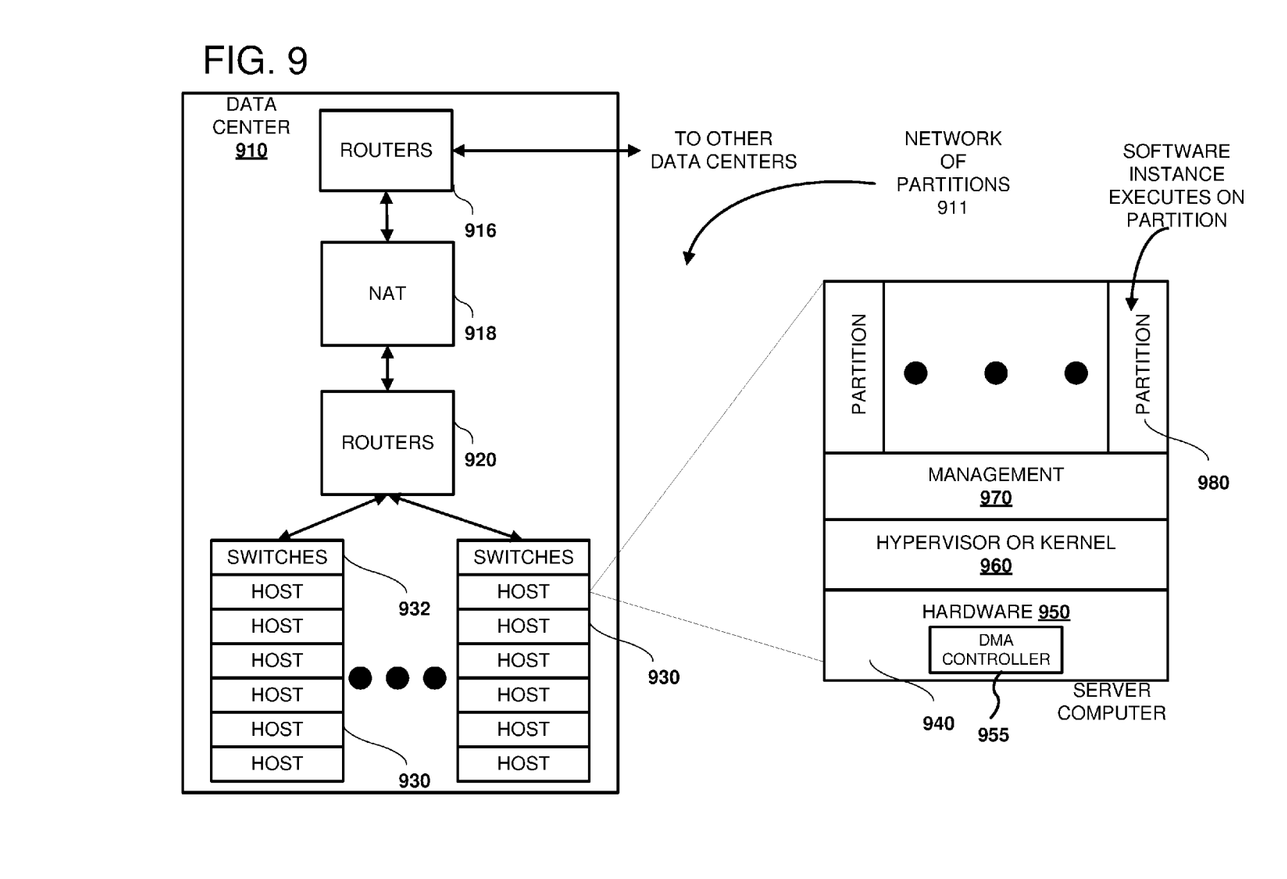
FIG. 9 shows an example of a plurality of host computers, routers and switches, which are hardware assets used for running virtual machine instances.

FIG. 9 illustrates a network of partitions 911 and the physical hardware associated therewith. The network of partitions 911 can include a plurality of data centers, such as data center 910, coupled together by routers 916. The routers 916 read address information in a received packet and determine the packet's destination. If the router decides that a different data center contains a host server computer, then the packet is forwarded to that data center. If the packet is addressed to a host in the data center 910, then it is passed to a network address translator (NAT) 918 that converts the packet's public IP address to a private IP address. The NAT also translates private addresses to public addresses that are bound outside of the datacenter 910. Additional routers 920 can be coupled to the NAT to route packets to one or more racks of host server computers 930. Each rack 930 can include a switch 932 coupled to multiple host server computers. A particular host server computer is shown in an expanded view at 940.

Each host 940 has underlying hardware 950 including one or more CPUs, memory, storage devices, etc. The hardware 950 can include one or more DMA controllers 955 for acceleration of DMA transactions between partitions on the same server or between partitions residing on different servers. Running a layer above the hardware 950 is a hypervisor or kernel layer 960. The hypervisor or kernel layer can be classified as a type 1 or type 2 hypervisor. A type 1 hypervisor runs directly on the host hardware 950 to control the hardware and to manage the guest operating systems. A type 2 hypervisor runs within a conventional operating system environment. Thus, in a type 2 environment, the hypervisor can be a distinct layer running above the operating system and the operating system interacts with the system hardware. Different types of hypervisors include Xen-based, Hyper-V, ESXi/ESX, Linux, etc., but other hypervisors can be used. A management layer 970 can be part of the hypervisor or separated therefrom and generally includes device drivers needed for accessing the hardware 950. The partitions 980 are logical units of isolation by the hypervisor. Each partition 980 can be allocated its own portion of the hardware layer's memory, CPU allocation, storage, etc. Further, any of the partitions can initiated and perform DMA transactions using the technologies described herein. For examples, the partitions can act as target and/or source hosts and use one or more DMA controllers in the hardware 950 to accelerate DMA transactions using transaction identifiers and local memory. Additionally, each partition can include a virtual machine and its own guest operating system. As such, each partition is an abstract portion of capacity designed to support its own virtual machine independent of the other partitions.

Figure 10:
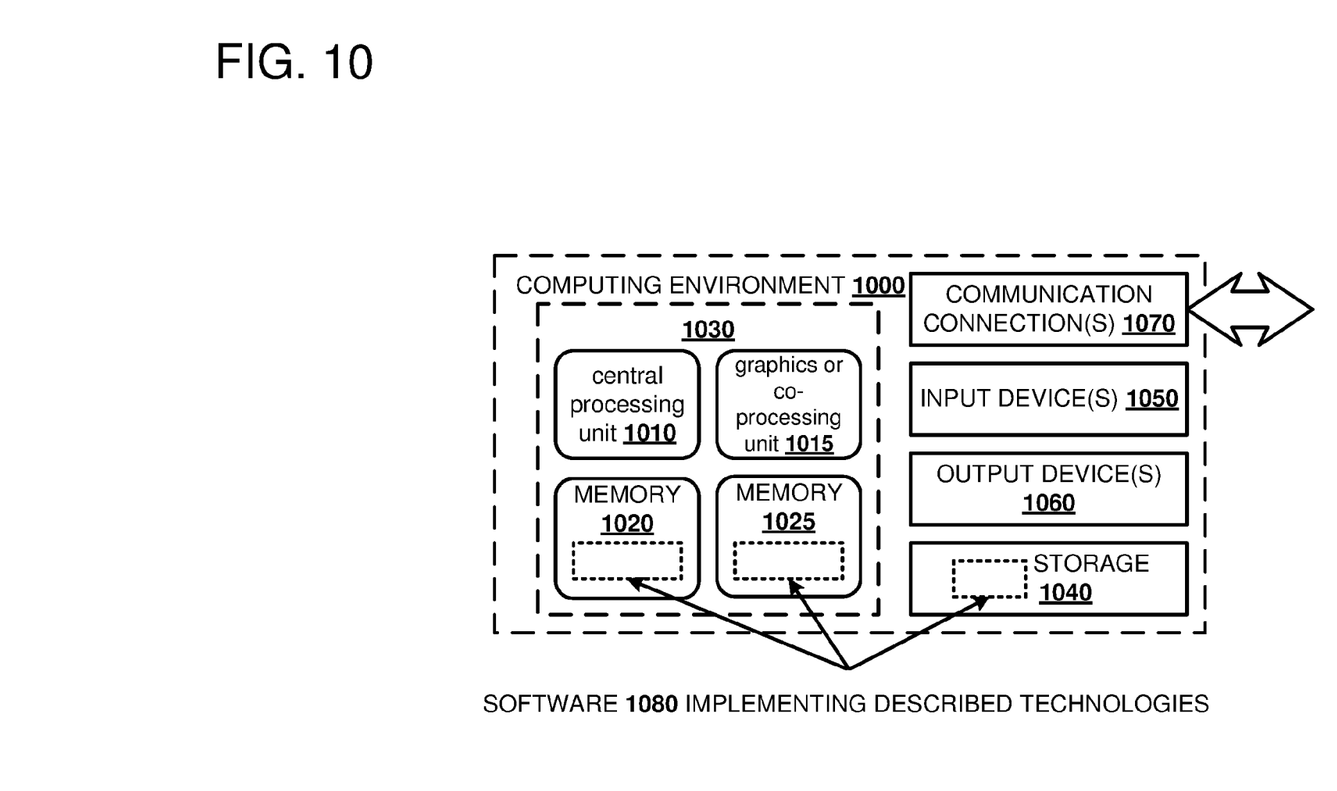
FIG. 10 depicts a generalized example of a suitable computing environment in which the described innovations may be implemented.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions, including instructions for implementing host operations for DMA transactions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. DMA transactions can be accelerated using a DMA controller coupled to the communications connections(s) 1070. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, assembly code, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed technology may be applied, it should be recognized that the illustrated embodiments are only examples and should not be taken as limiting the scope of the claimed subject matter. Rather, the scope of the invention is defined by the following claims. We therefore claim as our invention all that comes within the scope of these claims.

What is claimed is:

1. A method of reducing input/output (I/O) latency using a direct memory access (DMA) engine, the method comprising:
   generating by the DMA engine, a DMA descriptor read command, the DMA descriptor read command comprising a prefetch command;
   communicating a DMA descriptor and the prefetch command to a first parser in the DMA engine in response to the DMA descriptor read command;
   detecting the DMA descriptor and the prefetch command by a second parser;
   prefetching, by the second parser, data from memory to a cache based on memory address information in the DMA descriptor, wherein a data path between the second parser and the cache is shorter than a data path between the first parser and the cache; and
   in response to a data buffer read, accessing the data from the cache using the DMA engine.

2. The method according to claim 1, further comprising:
   parsing the DMA descriptor by the second parser, to obtain the memory address information, the memory address information comprising at least a memory address and size for a data buffer storing the data in the memory.

3. The method according to claim 2, wherein parsing the DMA descriptor by the second parser takes place while the DMA descriptor is communicated to the first parser.

4. The method according to claim 1, further comprising:
generating the data buffer read by the DMA engine; and
detecting that the data is available for accessing in the cache.

5. The method according to claim 1, further comprising:
communicating the DMA descriptor read command in an address-read channel of an Advanced eXtensible Interface (AXI) bus, wherein the prefetch command is a prefetch enable bit set in the address-read channel.

6. A computer-readable storage medium including instructions that upon execution cause a computer system to:
generate a direct memory access (DMA) descriptor read command for descriptor information associated with data stored in a memory buffer;
in response to the DMA descriptor read command, communicate the descriptor information to a first parsing engine in a DMA engine for parsing;
detect the descriptor information by a second parsing engine, while the descriptor information is communicated to the first parsing engine; and
prefetch, using the second parsing engine, the data from the memory buffer to cache, based on the detected descriptor information, wherein a physical distance between the second parsing engine and the cache is less than a physical distance between the first parsing engine and the cache.

7. The computer-readable storage medium according to claim 6, wherein the instructions, upon execution, further cause the computer system to:
prefetch the data buffer while the descriptor information is parsed by the first parsing engine.

8. The computer-readable storage medium according to claim 6, wherein the second parsing engine is outside of the DMA engine, and the second parsing engine uses a data path to the cache that is shorter than a data path from the DMA engine to the cache.

9. The computer-readable storage medium according to claim 6, wherein the descriptor information comprises:
a memory address for the memory buffer;
size of the memory buffer; and
information identifying a data processing operation.

10. The computer-readable storage medium according to claim 9, wherein the instructions, upon execution, further cause the computer system to:
access by the DMA engine the prefetched data from the cache; and
perform the data processing operation on the data.

11. The computer-readable storage medium according to claim 6, wherein the instructions, upon execution, further cause the computer system to:
parse the descriptor information by the first parsing engine;
issue a data read command for accessing the memory or the cache; and
access the prefetched data from cache, based on the parsed descriptor information.

12. The computer-readable storage medium according to claim 6, wherein the detecting of the descriptor information by the second parsing engine is based on a prefetch enable indicator associated with the descriptor information communicated to the first parsing engine.

13. The computer-readable storage medium according to claim 6, wherein the instructions, upon execution, further cause the computer system to:
communicate the DMA descriptor read command to a memory subsystem using an address-read channel associated with an Advanced eXtensible Interface (AXI) bus, an Advanced High-Performance Bus (AHB), or a communication bus associated with another communication protocol, wherein the memory subsystem comprises the cache and memory with the memory buffer.

14. The computer-readable storage medium according to claim 13, wherein the instructions, upon execution, further cause the computer system to:
store a prefetch enable indicator in a user field of the address-read channel.

15. A system, comprising:
a direct memory access (DMA) engine with a first parser; and
a memory subsystem, comprising:
a processor;
memory configured to store data;
cache that is separate from the memory; and
a second parser, the second parser being outside of the DMA engine and disposed such that the second parser has a shorter information pathway to the cache than an information pathway between the DMA engine and the cache;
wherein the processor is configured to:
store descriptor information in the cache, the descriptor information associated with the data;
signal the second parser to prefetch the data;
responsive to setting the register bit, receive a DMA descriptor read command for the descriptor information;
detect a prefetch enable indicator associated with the DMA descriptor read command; and
responsive to detecting the prefetch enable indicator, communicate the descriptor information to the first parser and the second parser.

16. The system of claim 15, further comprising:
another DMA engine, wherein the DMA engine and the other DMA engine are each associated with a different communication protocol, and wherein the second parser is configured to concurrently parse descriptors of the DMA engine and the other DMA engine.

17. The system of claim 15, wherein the system is a system-on-a-chip (SoC), a field programmable gate array (FPGA), an application-specific integrated circuit (ASIC), or a microprocessor.

18. The system of claim 15, wherein the second parser in the memory subsystem is further configured to:
parse the descriptor information to obtain a memory address of a data buffer storing the data in the memory.

19. The system of claim 18, wherein the second parser in the memory subsystem is further configured to:
prefetch the data from the memory into the cache, wherein a portion of the data is prefetched while the descriptor information is communicated to the first parser.

20. The system of claim 16, wherein the memory subsystem is further configured to:
in response to a data buffer read command from the DMA engine, provide the DMA engine access to the prefetched data stored in the cache.

\* \* \* \* \*